(12) United States Patent
Gamache et al.

(10) Patent No.: US 11,473,566 B2
(45) Date of Patent: Oct. 18, 2022

(54) GEOTHERMAL PILE

(71) Applicant: INOTEV INC., Adstock (CA)

(72) Inventors: Yves Gamache, Adstock (CA); Ziad Salloum, Quebec (CA)

(73) Assignee: INOTEV INC., Adstock (CA)

( * ) Notice: Subject to any disclaimer, the term of this patent is extended or adjusted under 35 U.S.C. 154(b) by 0 days.

(21) Appl. No.: 16/956,479

(22) PCT Filed: Dec. 19, 2018

(86) PCT No.: PCT/CA2018/051625
§ 371 (c)(1),
(2) Date: Jun. 19, 2020

(87) PCT Pub. No.: WO2019/119132
PCT Pub. Date: Jun. 27, 2019

(65) Prior Publication Data
US 2020/0347832 A1     Nov. 5, 2020

Related U.S. Application Data

(60) Provisional application No. 62/607,579, filed on Dec. 19, 2017.

(51) Int. Cl.
*F03G 7/04* (2006.01)
*F24T 10/40* (2018.01)
(Continued)

(52) U.S. Cl.
CPC .............. *F03G 7/04* (2013.01); *F24T 10/00* (2018.05); *F24T 10/40* (2018.05); *E02D 5/226* (2013.01);
(Continued)

(58) Field of Classification Search
CPC ... F03G 7/04; F24T 10/00; F24T 10/40; F24T 2010/50; E02D 5/226; E02D 5/56; Y02E 10/10
(Continued)

(56) References Cited

U.S. PATENT DOCUMENTS 3,723,189 A    3/1973  Zahn
4,047,093 A    9/1977  Levoy
(Continued)

FOREIGN PATENT DOCUMENTS

EP    0511180 A1 * 10/1992 ........... H02N 11/002
GB    2433753 B      5/2008
(Continued)

OTHER PUBLICATIONS

Cecinato et al., Influences on the thermal efficiency of energy piles, Energy, 2015, vol. 82, pp. 1021-1033, ISSN 0360-5442, retrieved from the Internet: <https://doi.org/10.1016/j.energy.2015.02.001>, recent retrieval on Nov. 16, 2020.
(Continued)

*Primary Examiner* — Mickey H France
(74) *Attorney, Agent, or Firm* — Morriss O'Bryant Compagni Cannon, PLLC

(57) ABSTRACT

A geothermal pile for harvesting electricity from a gradient of temperature between ambient air and an underground area is provided. The geothermal pile includes an elongated thermally-conductive body, a thermoelectric cell and an electrical output. The elongated thermally-conductive body has a first end and a second end opposite the first end. The second end is configured to be introduced, in use, into an underground area. The thermoelectric cell is provided at the first end so as to be exposed to ambient air when the second end is introduced into the underground area. The thermoelectric cell is in thermal contact with the second end of the
(Continued)

elongated thermally-conductive body and is configured to generate electricity from a gradient of temperature between a first temperature of the ambient air and a second temperature of the underground area. The electrical output is electrically connected to the thermoelectric cell.

24 Claims, 18 Drawing Sheets

(51) Int. Cl.
*F24T 10/00* (2018.01)
*E02D 5/22* (2006.01)
*E02D 5/56* (2006.01)

(52) U.S. Cl.
CPC ............. *E02D 5/56* (2013.01); *F24T 2010/50* (2018.05); *Y02E 10/10* (2013.01)

(58) Field of Classification Search
USPC ............................................. 60/641.1–641.7
See application file for complete search history.

(56) References Cited

U.S. PATENT DOCUMENTS

| | | | |
|---|---|---|---|
| 5,929,372 | A | 7/1999 | Oudoire et al. |
| 7,647,979 | B2 | 1/2010 | Shipley et al. |
| 7,770,645 | B2 | 8/2010 | Jeffryes |
| 2012/0152297 | A1 | 6/2012 | Mitchell et al. |
| 2012/0192908 | A1 | 8/2012 | Kline |
| 2013/0180563 | A1* | 7/2013 | Makansi ................ H01L 35/06 136/206 |
| 2018/0077817 | A1* | 3/2018 | Tang-Kong ........... H01L 23/367 |
| 2018/0198048 | A1* | 7/2018 | Sugimoto ............... H01L 35/02 |

FOREIGN PATENT DOCUMENTS

| | | | |
|---|---|---|---|
| KR | 20090130910 | A * | 12/2009 |
| WO | 2015005340 | A1 | 1/2015 |

OTHER PUBLICATIONS

Kramer, An experimental investigation of performance of a model geothermal pile in sand, The Pennsylvania State University, Department of Civil and Environmental Engineering [online] retrieved on Mar. 7, 2019, retrieved from the Internet: <https://etda.libraries.psu.edu/files/final_submissions/8760>, recent retrieval on Nov. 16, 2020.
PCT International Search Report for PCT/CA2018/051625, dated Mar. 20, 2019, 4 pages.
PCT Written Opinion for PCT/CA2018/051625, dated Mar. 20, 2019, 4 pages.

* cited by examiner

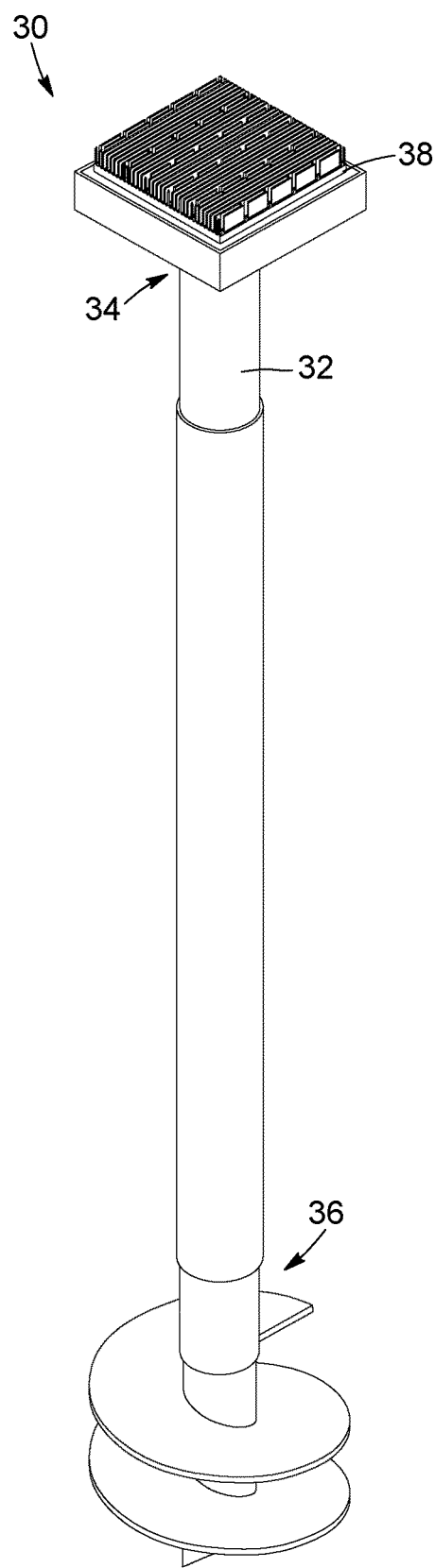
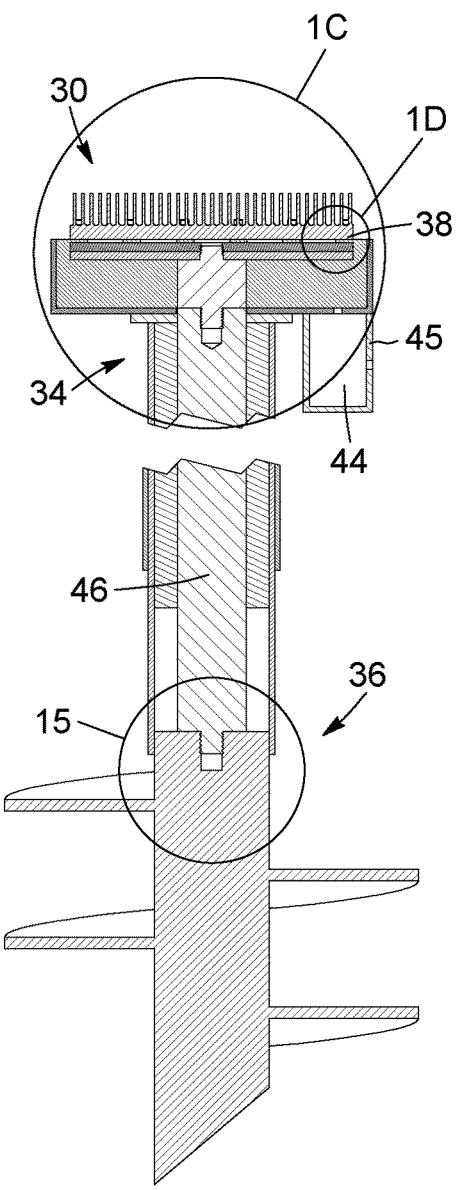
FIG. 1A
FIG. 1B

GEOTHERMAL PILE

CROSS-REFERENCE TO RELATED APPLICATIONS

This application is a national phase entry under 35 U.S.C. § 371 of PCT/CA2018/051625 filed on Dec. 19, 2018, which claims priority to U.S. Provisional Patent Application No. 62/607,579 filed on Dec. 19, 2017, the entirety of each of which is incorporated by reference.

TECHNICAL FIELD

The technical field generally relates to geothermal energy applications, and more particularly concerns a thermoelectric system for harvesting electricity from a gradient of temperature between ambient air and an underground area.

BACKGROUND

Devices allowing to harvest geothermal energy are known in the art.

By way of example, U.S. Pat. No. 4,047,093 (LEVOY) teaches a direct conversion system for in situ conversion of geothermal energy into electricity. The system includes two co-axially extending heating pipes extending between a high temperature geological stratum and a low temperature geological stratum. Thermoelectric energy conversion devices are positioned within an annulus between the intersecting pipes.

U.S. Pat. No. 7,770,645 (JEFFRYES) teaches a system for providing power to a wellbore using a thermoelectric generator.

U.S. patent application published under no. 2012/0152297 (MITCHELL et al.) shows a power generator using a thermoelectric device adapted to produce electricity according to the Seebeck effect when a thermal gradient is imposed between opposite major surfaces of the device.

Despite the above art, there remains a need for a geothermal pile that provides improvements over known devices.

SUMMARY

In accordance with one aspect, there is provided a geothermal pile. The geothermal pile includes an elongated thermally-conductive body, a thermoelectric cell and an electrical output. The elongated thermally-conductive body has a first end and a second end opposite the first end. The second end is configured to be introduced, in use, into an underground area. The thermoelectric cell is provided at the first end so as to be exposed to ambient air when the second end is introduced into the underground area. The thermoelectric cell is in thermal contact with the second end of the elongated thermally-conductive body and is configured to generate electricity from a gradient of temperature between a first temperature of the ambient air and a second temperature of the underground area. The electrical output is electrically connected to the thermoelectric cell.

In some embodiments, the thermoelectric cell includes one or more thermoelectric generators, each thermoelectric generator including a thermoelectric junction.

In some embodiments, the thermoelectric junction includes two plates and a thermoelectric material in contact with and sandwiched between the two plates.

In some embodiments, a first one of the two plates has a first outer surface and a second one of the two plates has a second outer surface opposite the first outer surface, the first outer surface and the second outer surface being respectively exposed to the first temperature and the second temperature when the second end is introduced into the underground area.

In some embodiments, the elongated thermally-conductive body is made from copper.

In some embodiments, the elongated thermally-conductive body is a rod having a substantially circular cross-section.

In some embodiments, the geothermal pile further includes a metal tube and the elongated thermally-conductive body is concentrically disposed within the metal tube.

In some embodiments, the geothermal pile further includes an insulating tube and the metal tube is concentrically disposed within the insulating tube.

In some embodiments, the geothermal further includes a plastic tube and the insulating tube is concentrically disposed within the plastic tube.

In some embodiments, the second end is tapered.

In some embodiments, the geothermal further includes a helicoidal end part affixed to the second end of the elongated thermally-conductive body, the helicoidal end part having a rotation axis aligned with a longitudinal axis of the elongated thermally-conductive body, the helicoidal end part being configured to enter the ground when pushed towards the ground and rotated about the rotation axis, thereby inserting the second end into the underground area.

In some embodiments, the helicoidal end part is made from carbon steel.

In some embodiments, the thermoelectric cell converts the gradient of temperature into electricity through the Seebeck effect.

In some embodiments, the geothermal further includes an atmospheric heat sink provided at the first end, the atmospheric heat sink being thermally coupled with the ambient air and with the thermoelectric cell.

In some embodiments, the atmospheric heat sink extends over the thermoelectric cell.

In some embodiments, the atmospheric heat sink is made from aluminum.

In some embodiments, the geothermal further includes a temperature sensor mounted at the first end, the temperature sensor being thermally coupled with the thermoelectric cell.

In some embodiments, the geothermal further includes a housing for receiving the thermoelectric cell, the atmospheric sink and the temperature sensor.

In some embodiments, the geothermal pile further includes a submergible heat sink provided at the second end.

In some embodiments, the submergible heat sink is made from aluminum.

In accordance with another aspect, there is provided a geothermal pile for harvesting electricity from a gradient of temperature between ambient air and an underground area.

In accordance with some embodiments, the geothermal pile includes a thermally conductive body, at least one thermoelectric generator and an electrical output. The thermally conductive body has a first end and a second end opposite the first end. The first end is typically exposed to the ambient air, while the second end is, in use, exposed to the underground area. The at least one thermoelectric generator is provided at the first end. The at least one thermoelectric generator has a first surface in thermal connection with the ambient air and a second surface in thermal connection with the underground area through the thermally conductive body, thereby generating the electricity as a result of the gradient of temperature. The electrical output is electrically coupled to the at least one thermoelectric generator and is configured for extracting the electricity from the thermoelectric generator.

Other features and advantages of the invention will be better understood upon reading of preferred embodiments thereof with reference to the appended drawings.

BRIEF DESCRIPTION OF THE DRAWINGS

FIGS. 1A-D show a geothermal pile for harvesting electricity from a gradient of temperature, in accordance with one embodiment.

DETAILED DESCRIPTION

Figure 1D:
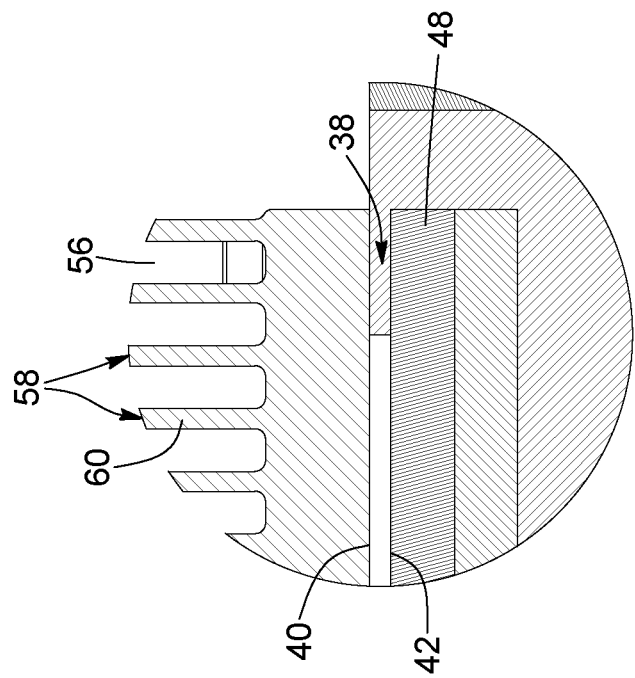
Figure 1C:
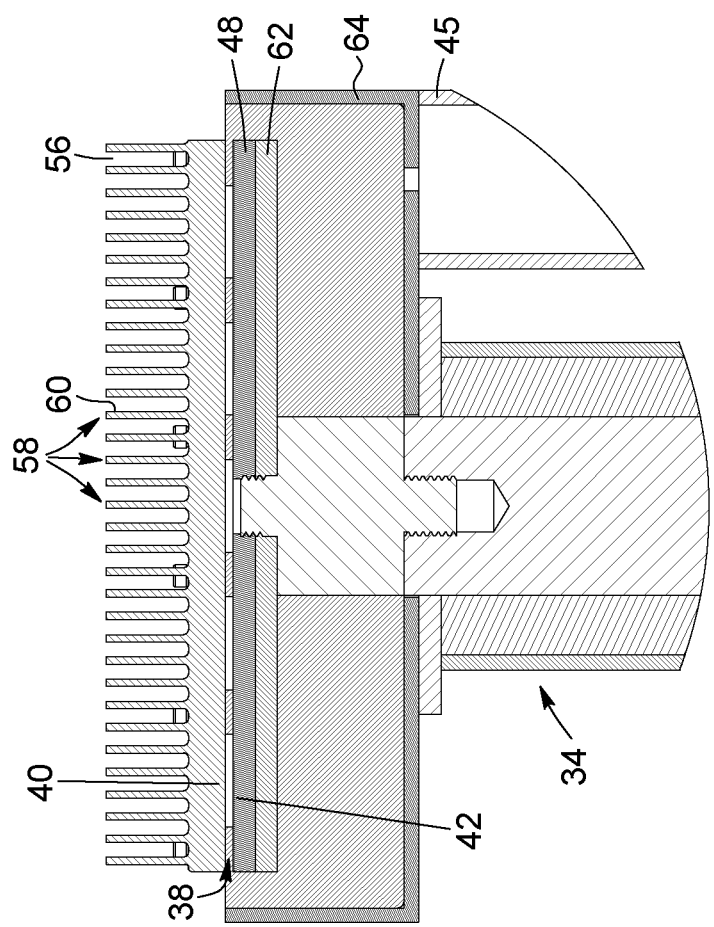

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

Broadly described, there is provided a geothermal pile for harvesting electricity from a gradient of temperature between ambient air and an underground area.

The term "geothermal pile" will herein refer to a pile designed, configured and operated to serve as a heat exchanger between two mediums. Examples of a first medium include, but are not limited to the ambient air, whereas examples of the second medium include, but are not limited to the underground area. In operation, the geothermal pile recovers heat and generates electricity which could later be extracted and therefore used. More specifically, the geothermal pile can harvest energy from the gradient of temperature between the ambient air and the underground area. It is to be noted that, in the following description, the expression "ambient air" generally refers to the layer of gases surrounding the Earth, but may also encompass a broad variety of media (for example the air contained in a cave or in a close environment). Of course, it will be readily understood that the different characteristics (such as the temperature, the composition, the phase, and the like) of the ambient air may vary. For example, the characteristics of the ambient air may vary according to the geographical area in which the geothermal pile is operated. The expression "underground area" is understood as an area typically located below the surface of the Earth. The expression may encompass, for example and without being limitative, subsoil (i.e., soil lying under the surface of the Earth), water (e.g. river, lake, or the like), liquid medium, mud, gas, or the like. It will be readily understood that the ambient air and the underground area may exhibit dynamical properties (i.e., that their properties may vary in time). It is understood that the ambient air and the underground area generally have substantially different properties. For example, and without being limitative, the ambient air and the underground area are generally at different temperatures.

The geothermal pile presented in the following description may be useful, for example, in remote or isolated areas, such as hunting and camping sites and may be used as an auxiliary or supplementary power source. For example, the geothermal pile could be used as a backup source of energy or for charging small devices and apparatuses, such as and without being limitative, phone, GPS, computers, lights, and the like. The geothermal pile may also be easy to install and/or uninstall and could be to some extent portable, so that it may be useful for providing power to temporary installations.

Now turning to the Figures, embodiments of the geothermal pile will be described in greater detail.

With reference to FIGS. 1A-D, an embodiment of a geothermal pile 30 is shown.

The geothermal pile 30 includes an elongated thermally-conductive body 32, which is sometimes simply referred to as the "thermally-conductive body". The thermally-conductive body 32 has a first end 34 and a second end 36 opposite the first end 34. The second end 36 is configured to be introduced, in use, into the underground area. Namely, in use, the first end 34 is exposed to the ambient air, while the second end 36 is exposed to the underground area. It is to be noted that the expression "exposed", "introduced", "inserted", or similar expressions, when used in the context of the describing the second end 36, may be used interchangeably. Indeed, it is understood that such expressions denote that the second end 36 can be engaged or contact the underground area so as the second end 36 is exposed or maintained at the temperature of the underground area. Generally described, the first end 34 and the second end 36 are exposed to different media, each of the media being at a different temperature, so as to create the gradient of temperature in the elongated thermally-conductive body 32. For example, in some scenarios, the gradient of temperature is defined between a first temperature, which is associated or related to the temperature of the ambient air, and a second temperature, which is associated or related to the temperature of the underground area.

In the illustrated embodiments, the elongated thermally-conductive body 32 is a rod 46. The rod 46 could be made from a broad variety of thermally-conductive materials. For example, in one embodiment, the rod 46 is made from copper. The shape and geometrical configuration of the elongated thermally-conductive body 32 or the rod 46 can also vary. For example, in one embodiment, the rod 46 has a substantially circular cross-section. It will readily be understood that the rod 46 could alternatively be made from silver, aluminum, iron, lead, steel, various metals or alloys, combinations thereof, or any other materials having the desired structural and mechanical properties and thermal conductivity. The expression "thermal conductivity" is herein referring to the properties or ability to conduct heat. Alternatively, the elongated thermally-conductive body 32 could be embodied by a bar, a stick, a stake, a post, a pole, or any elongated body having the required structural properties (i.e., two opposed ends), as well as the aforementioned thermal properties.

Figure 4A:
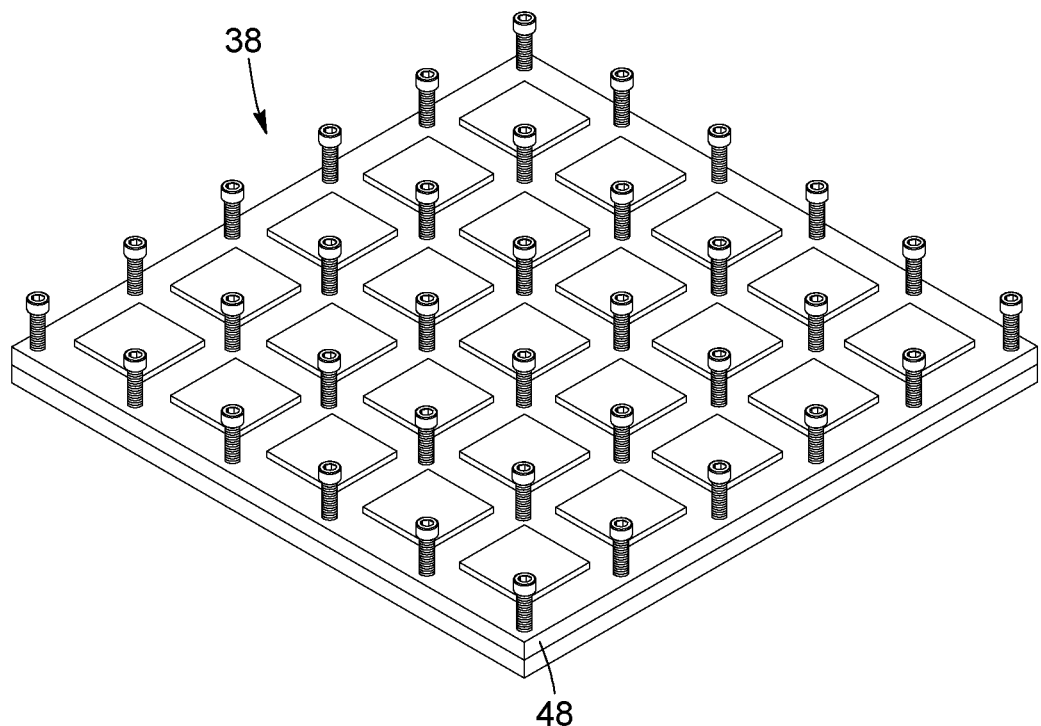
FIGS. 4A-B show a plurality of thermoelectric generators provided on a base plate, in accordance with one embodiment.
Figure 4B:
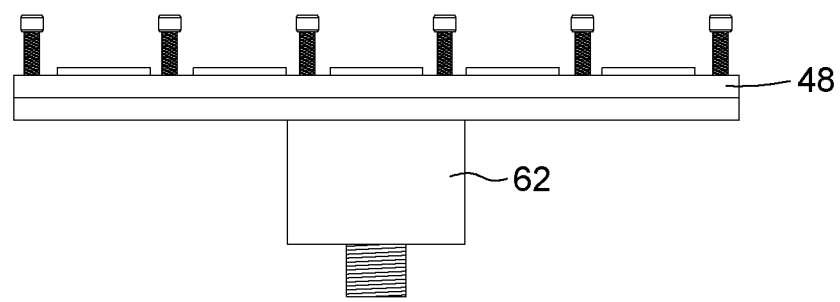

The geothermal pile 30 also includes a thermoelectric cell 38. In the illustrated embodiments, each thermoelectric cell 38 includes one or more thermoelectric generators. Each thermoelectric generator comprises a thermoelectric junction. It is understood that the thermoelectric cell could include any number of thermoelectric generator(s), depending on the power to be generated by the geothermal pile 30. In one embodiment, such as the one illustrated in FIGS. 2 and 4A, the thermoelectric cell 38 can include 25 thermoelectric generators.

As for its positioning, the thermoelectric cell 38 is provided at the first end 34 of the elongated thermally-conductive body 32.

In some embodiments, each thermoelectric junction comprises two plates and a thermoelectric material in contact with and sandwiched between said two plates. In the illustrated embodiments, a first one of said two plates has a first outer surface 40 and a second one of said two plates has a second outer surface 42 opposite the first outer surface 40. In use, namely when the second end 36 is introduced into the underground area, the first outer surface 40 and the second outer surface 42 are respectively exposed to the first temperature and the second temperature. As such, the first outer surface 40 is in thermal connection with the ambient air and the second outer surface 42 is in thermal connection with the underground area through the elongated thermally-conductive body 32. The exposition of the first outer surface 40 to the first temperature and the second outer surface 42 to the second temperature generates the gradient of temperature, which result in a production of electricity.

As understood in the context of the current description, the expression "thermal connection" herein refers to the ability of the first and second outer surfaces 40, 42 to exchange and/or transfer heat with the ambient air and the underground area, respectively. While the first outer surface 40 may be at the same temperature as the ambient air and the second outer surface 42 may be at the same temperature as the underground area, it will be understood that the first and second surfaces 40, 42 may also absorb (i.e., transfer or exchange) only a portion of the heat from their respective environment (i.e., the ambient air or the underground area), so as the first and second outer surfaces 40, 42 are maintained at temperatures that are slightly or sometimes significantly different than their respective environment, as long as the gradient of temperature is maintained between the first and second surfaces 40, 42. Of course, the gradient of temperature has to be sufficient to generate electricity, when the geothermal pile 30 is in use, namely when the second end 36 is introduced into the underground area. For example, a gradient of temperature of about 15° C. is typically appropriate for generating electricity from the thermoelectric cell 38 (or the thermoelectric generators).

By way of example, the thermoelectric cell 38 may convert the gradient of temperature into electricity through the Seebeck effect. As such, the thermoelectric cell 38 can be referred to as a Seebeck cell or module, whereas the thermoelectric generators can be referred to as Seebeck generators. As it will be readily understood by one skilled in the art, the thermoelectric material included in the thermoelectric cell 38 or an individual thermoelectric generator typically presents good mechanical and thermal stability, as well as appropriate Seebeck coefficient for the targeted application(s).

In some embodiments, the plurality of thermoelectric generators is electrically connected in series to form the thermoelectric cell 38. Using the thermoelectric cell 38 instead of a single thermoelectric generator may be useful, for example, for extracting electricity from a relatively small temperature difference and/or to at least optimize the electricity (i.e., power, voltage or the electrical current) extracted from the gradient of temperature by the thermoelectric cell 38.

Figure 2:
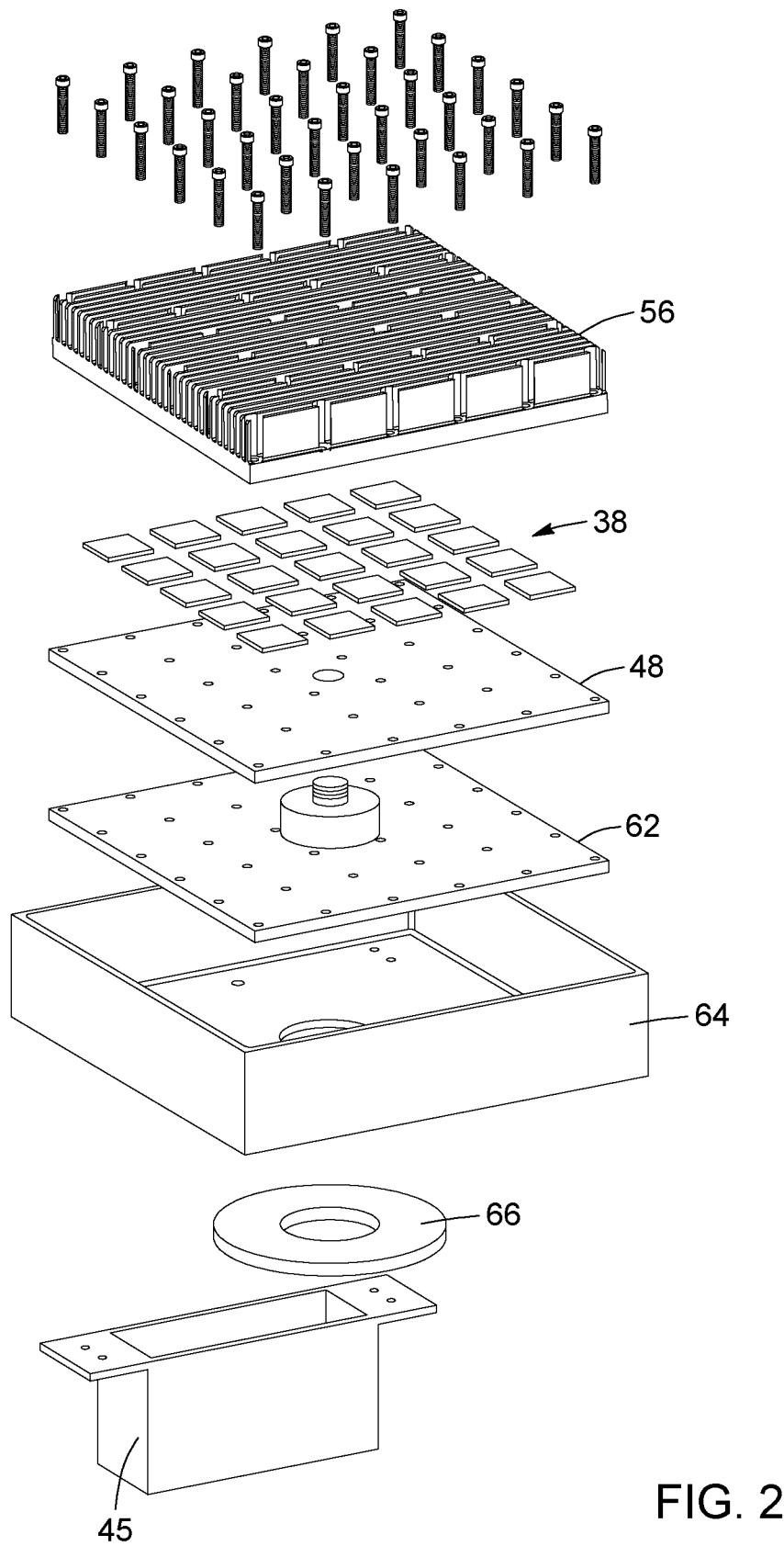
FIG. 2 illustrates an exploded view of a portion of a first end of the geothermal pile shown in FIGS. 1A-D.
Figure 3B:
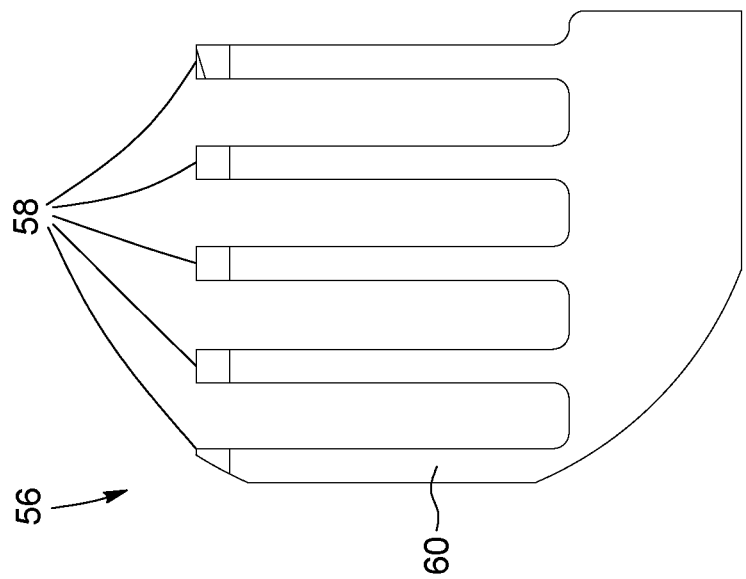
FIGS. 3A-B show an atmospheric heat sink, in accordance with one embodiment.
Figure 3A:
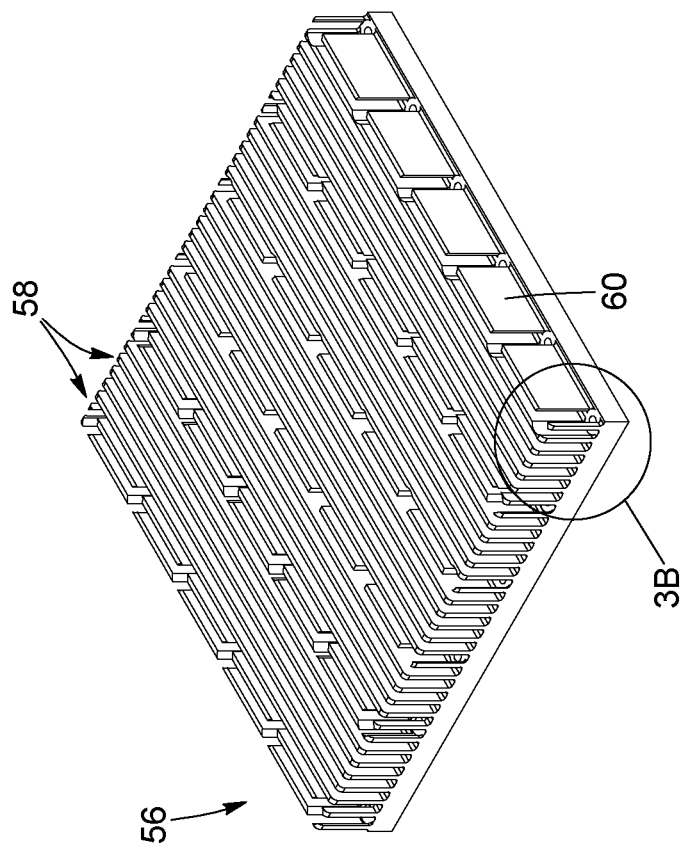
Figure 5:
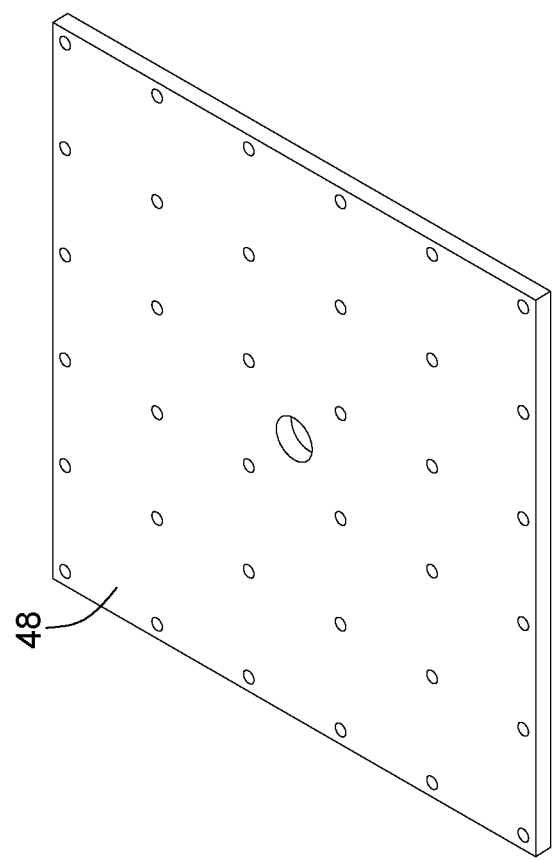
FIG. 5 illustrates a base plate for supporting a plurality of thermoelectric generators, in accordance with one embodiment.

In one embodiment illustrated, for example, in FIGS. 2 and 5, the geothermal pile 30 includes a base plate 48. The base plate 48 can be embodied by one plate or a plurality of components assembled together defining a plate serving as a base onto which various components may be mounted.

The base plate 48 typically has a top portion, and the thermoelectric cell 38 (or, alternatively, the thermoelectric generators) is provided on this top portion. As illustrated, the base plate 48 has a substantially square shape and is made from copper. Optionally, the base plate 48 may be made from a different thermally-conductive material, as previously listed. Of course, the base plate 48 could have various geometrical configurations (i.e., size and dimensions), and could, for example, have a triangular, rectangular, circular, or any other shaped body useful to one skilled in the art. The size of the base plate 48 is typically influenced by the number and dimension of the thermoelectric generator(s) mounted onto the base plate 48.

The thermoelectric cell 38 may be affixed to the base plate 48 by various affixing means, including, but not limited to glues, screws, clips, snap-lock, combinations thereof or any other means and/or components.

The geothermal pile 30 may include, such as for example illustrated in FIGS. 1 to 3A and 3B, an atmospheric heat sink 56 thermally coupled with the ambient air. The expression "thermally coupled" is herein understood as the capacity of the atmospheric heat sink 56 to exchange heat from the ambient air (i.e., "atmospheric") to the atmospheric heat sink 56, or vice versa, according to one's needs and the targeted application. Thermal coupling may for example be achieved through direct or indirect contact, i.e., with or without the use of intermediate components.

The atmospheric heat sink 56 is typically mounted proximate or at the first end 34, and may for example, extend over the thermoelectric cell 38. The atmospheric heat sink 56 is also in thermal connection with the first outer surface 40 of the thermoelectric junction, hence allowing the first outer surface 40 to be in thermal connection with the ambient air. In the example of FIG. 2, a plurality of thermoelectric generators is disposed in a 2D array embodying the thermoelectric cell 38 the atmospheric heat sink 56 extends over the 2D array of thermoelectric generators.

As better seen in FIG. 3, the atmospheric heat sink 56 comprises an array of vertically projecting fins 58, the array of vertically projecting fins 58 comprising a plurality of individual rectangular fins 60. The atmospheric heat sink 56 has a surface area that is designed and configured to at least optimize or maximize the thermal contact with or the exposure to the ambient air. The material, the geometrical configuration and/or surface treatment of the surface area of the atmospheric heat sink 56 are selected according to the needs of one skilled in the art. The atmospheric heat sink 56 is typically made from aluminium. In one embodiment, the atmospheric heat sink 56 is made from 1060-H16. Alternatively, other thermally conductive and thermally stable materials may be used. For example, aluminum could be replaced by copper. As it will be readily understood, the material(s) forming the atmospheric heat sink 56 is at least a good thermal conductor but is also mechanically and thermally stable in the operating conditions of the geothermal pile 30.

Figure 6:
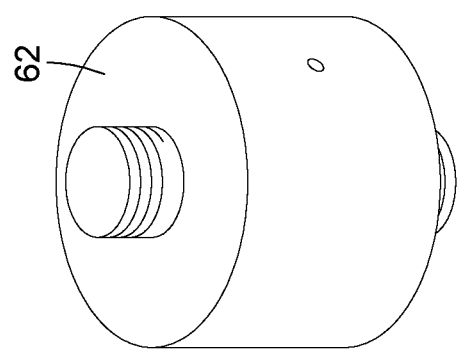
FIG. 6 illustrates a temperature sensor, in accordance with one embodiment.
Figure 7:
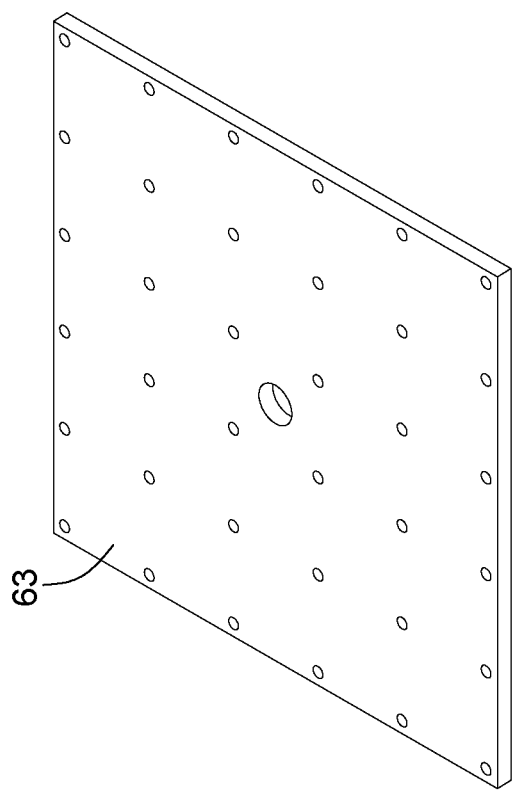
FIG. 7 shows a sensing plate onto which the temperature sensor of FIG. 6 can be mounted, in accordance with one embodiment.

As illustrated in FIGS. 6 and 7, the geothermal pile 30 may also include a temperature sensor 62 provided on top of a sensing plate 63. The temperature sensor 62 may be, in one variant, a resistance thermometer formed from a pure material (i.e., not an alloy) such as, but not limited to copper, platinum or nickel. The material used in the temperature sensor 62 should at least have a known resistance vs. temperature relationship or other predetermined properties allowing to identify the material. The resistance vs. temperature relationship is used to provide an indication of the temperature value near the temperature sensor 62. The sensing plate 63 may also be made from copper and is thermal connection with the second end 36 through the elongated thermally-conductive body 32.

The temperature sensor 62 (and the sensing plate 63) may be mounted near or at the first end 34. The temperature sensor 62 is thermally coupled with at least one of the first and second outer surfaces 40, 42. Optionally, the geothermal pile 30 may comprise a plurality of temperature sensors 62 mounted at different locations, so as to estimate the temperature at those different locations. In some implementations, estimating the temperature could be useful, for example, for determining a region where the gradient of temperature is such that the geothermal pile 30 may be operated to meet predetermined requirements (e.g., in a region where the gradient of temperature is at least locally close to a maximum value or close to an optimal value). Estimating the temperature could also be useful to estimate the energy which may be harvested (i.e., "extracted") from the underground area with the geothermal pile 30.

Figure 8:
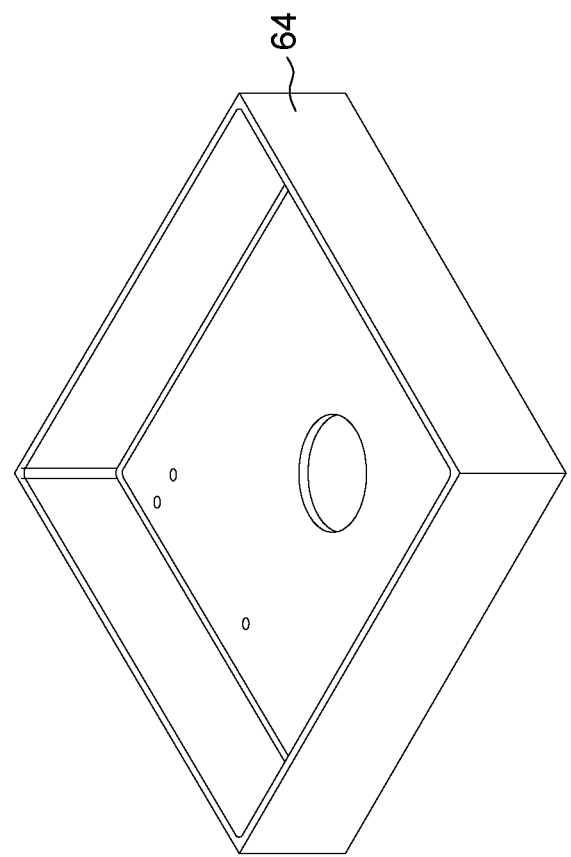
FIG. 8 shows a housing for receiving elements of the geothermal pile, in accordance with one embodiment.

Referring back to FIG. 2, the geothermal pile 30 may further include a housing 64 provided at the first end 34. The housing 64, for example illustrated in FIG. 8, is designed and size for enclosing the thermoelectric cell 38, the atmospheric heat sink 56, the support plate 48, the temperature sensor 62, and the sensing plate 63. In such configuration, the sensing plate 63, the base plate 48, and the atmospheric heat sink 56 each comprises a plurality of holes into which may be inserted screws, nails, bolts, or the like, so as to secure (i.e. mechanically join) the sensing plate 63, the base plate 48, and the atmospheric heat sink 56 together. As mentioned above, the at least one thermoelectric cell 38 is then comprised (i.e., "sandwiched") and held in place between the atmospheric heat sink 56 and the base plate 48.

The housing 62 may be made from a polymeric material and has a substantial square bottom portion. In some embodiments, the polymeric material may be a thermoplastic polymer, such as acrylonitrile butadiene styrene (ABS, chemical formula $(C_8H_8 \cdot C_4H_6 \cdot C_3H_3N)_n$). Alternatively, the housing material could be made from polyvinyl chloride (PVC, chemical formula $(C_2H_3Cl)_n$). As it will be readily understood, the geometrical configuration, such as the size and shape, as well as the material(s) forming the housing may vary according to one's needs, such as and without being limitative, the temperature of ambient air.

Figure 10:
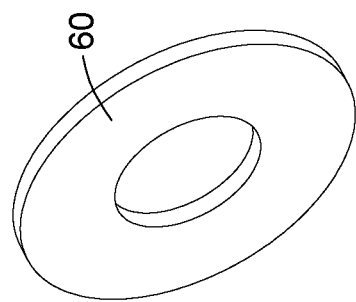
FIG. 10 illustrates an insulating element, in accordance with one embodiment.

The geothermal pile 30 may also include an insulating element 60, as illustrated in FIG. 10. The insulating element 60 may be provided at the bottom portion of the housing 62 and could be useful, for example, for insulating the geothermal pile 30 near the first end 34, and more particularly at an interface formed by the first end 34 and the housing 62 mounted onto the first end 34. For example, the insulating element 60 may be a ring made of an aerogel material. Alternatively, the insulating element 60 could be made from insulating gel(s) or silicone-based paste.

Figure 12:
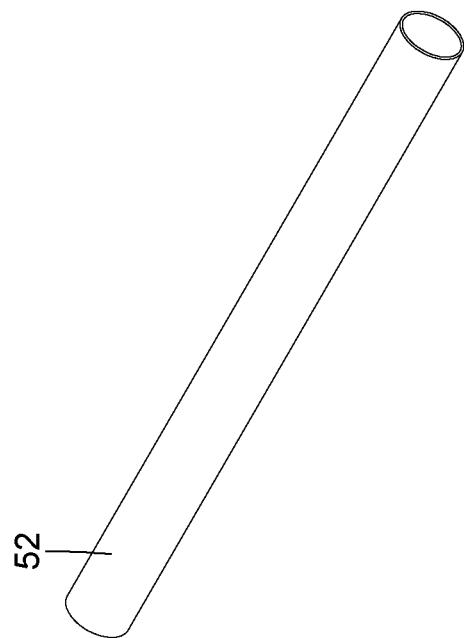
FIG. 12 illustrates an embodiment of a metal tube into which the elongated thermally-conductive body of FIG. 11 can be concentrically mounted.
Figure 11:
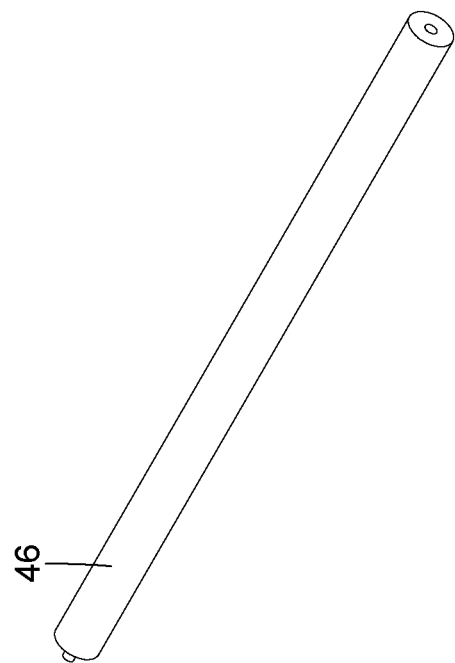
FIG. 11 illustrates an elongated thermally-conductive body, in accordance with one embodiment.
Figure 14:
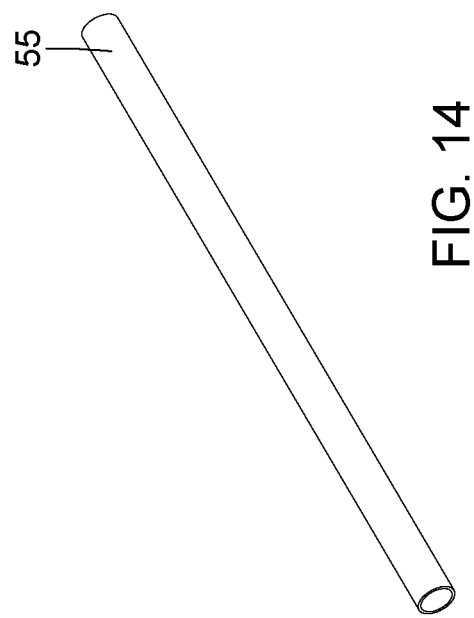
FIG. 14 illustrates an embodiment of a plastic pipe into which the insulating of FIG. 13 can be concentrically mounted.
Figure 13:
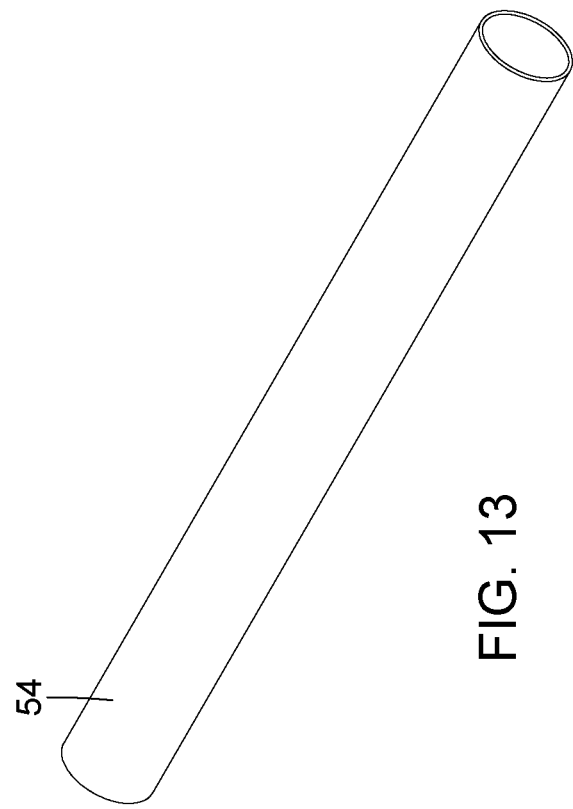
FIG. 13 illustrates an embodiment of an insulating tube into which the metal tube of FIG. 12 can be concentrically mounted.

As illustrated in FIG. 1, but also in FIGS. 12 to 14, the geothermal pile 30 may further comprise a metal tube 52, an insulating tube 54, and a plastic pipe 55. The rod 46, the metal tube 52, the insulating tube 54 and the plastic pipe 55 are concentrically disposed, meaning that that the rod 46 is inserted into the metal tube 52, which is inserted into the insulating tube 54, the latter being inserted into the plastic pipe 55. Such configuration allows for a more efficient thermal exchange from the first end 34 to the second end 36 through the thermally conductive body 32 (e.g., the rod 46) and ensure a good or a better insulation of the geothermal pile 30 from its outer environment along the outer periphery of the elongated thermally-conductive body 32 (e.g., the rod 46).

Figure 15:
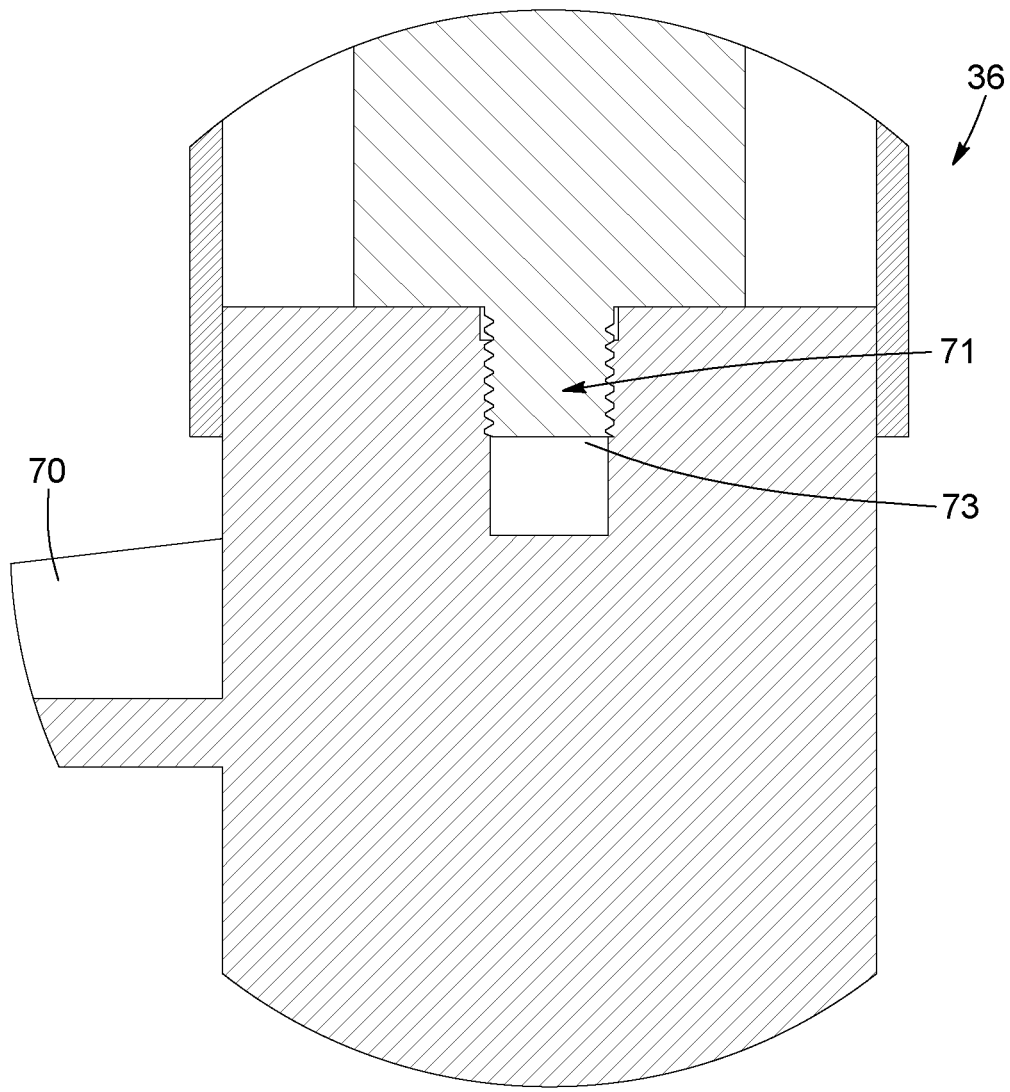
FIG. 15 shows a close-up view of a second end of the geothermal pile, in accordance with one embodiment.
Figure 16:
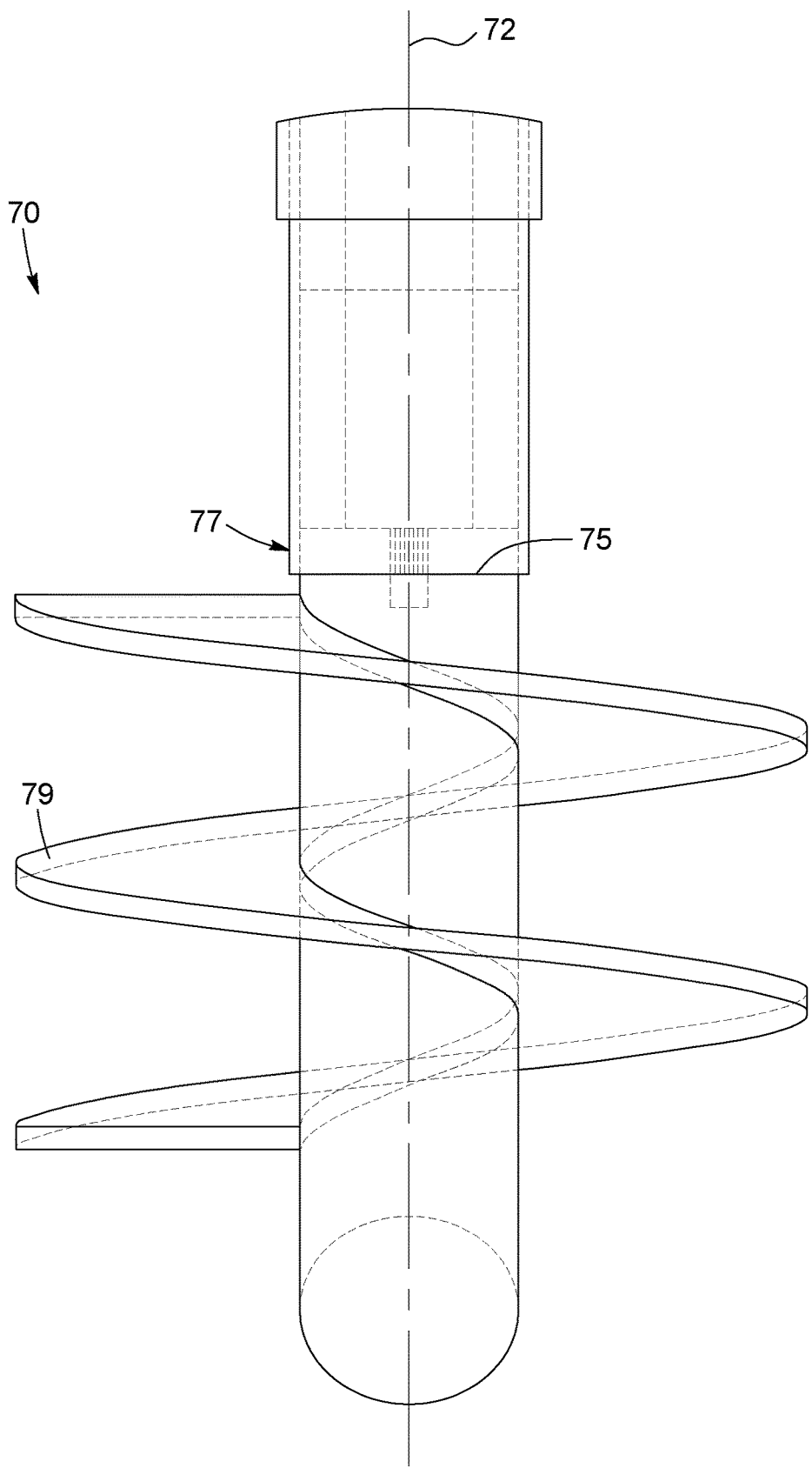
FIG. 16 shows a helicoidal end part mounted to the second end of the elongated thermally-conductive body, in accordance with one embodiment.
Figure 17:
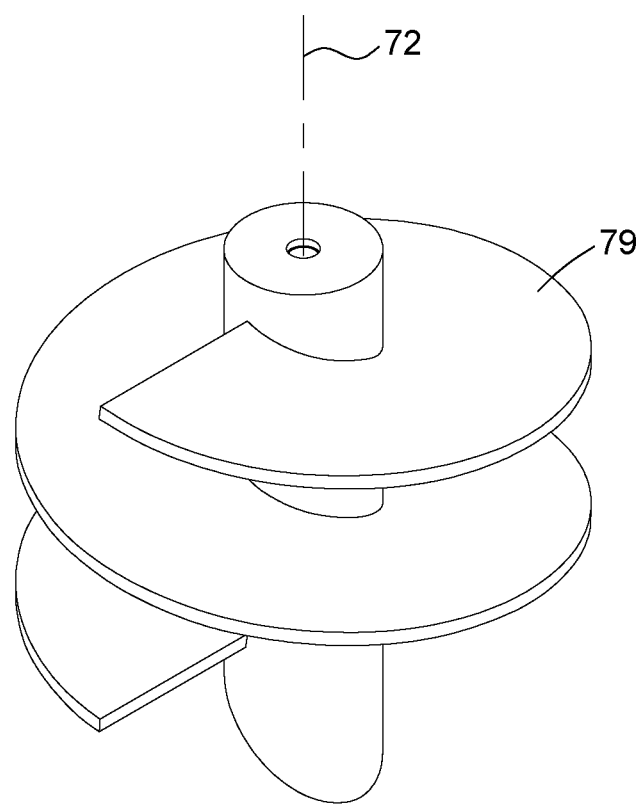
FIG. 17 shows a helicoidal end part, in accordance with one embodiment.

The second end 36 is typically configured, sized and positioned so as to allow the geothermal pile 30 to be inserted and secured to the ground. In some embodiments, the second end 36 of the thermally-conductive body 32 is tapered (i.e., the second end 36 may reduce in diameter or thickness towards an extremity of the second end 36). In other embodiments, and as better illustrated in FIGS. 15 to 17, the geothermal pile 30 can include a helicoidal end part 70 affixed to the second end 36. The helicoidal end part 70 has a rotation axis 72 aligned with a longitudinal axis of the elongated thermally-conductive body 32. The helicoidal end part 70 is configured to enter the ground when being pushed towards the ground and rotated about its rotation axis, so that the second end 36 is exposed to the underground area (e.g., a portion of the ground). The helicoidal end part 70 has a dimension (e.g., a height) sufficient to extend beyond the second end 36 and to permit sufficient engagement with the ground, thus providing stability to the geothermal pile 30, when inserted into the ground. Alternatively, the second end 36 could include a stake member or the like, hence allowing the second end 36 to be inserted into the ground.

The second end 36 may include, for example, a threaded protuberance 71. In such configuration, the helicoidal end part 70 comprises a threaded notch 73, so as the threaded protuberance 71 and threaded notch 73 are mechanically compatible. The threaded notch 73 of the helicoidal end part 70 may be rotatably mounted to the second end 36 via the threated protuberance 71, namely, the helicoidal end part 70 may be screwed to the second end 36), so as the helicoidal end part 70 is tightly mounted to the second end 36

The helicoidal end part 70 may be made from different materials. By way of an example, the helicoidal end part 70 may be made from carbon steel. The expression carbon steel is typically referred to as steel with carbon content up to 2.1% (or other appropriate content set forth by one skilled in the art) to which other elements (e.g., chromium, cobalt, molybdenum, nickel, niobium, titanium, tungsten, vanadium or zirconium) may be added to obtain specific desired properties. In the illustrated variant, the helicoidal end part 70 is made from ASTM A500. Alternatively, the helicoidal end part 70 could be made from other materials, such as, for example and without being limitative, ASTM A501.

As previously explained, the helicoidal end part 70 is in mechanical contact with the extremity of the second end part 36, hence forming a bottom boundary 75. The bottom boundary 75 has an external edge 77 (see for example FIG. 17). The helicoidal end part 70 may be welded to the extremity of the second end part 36 near the bottom boundary 75, along the external edge 77. Alternatively, other elements(s) and/or component(s) may be used to hold the helicoidal end part 70 and the second end part 36 together. For example, glue, tape, bolts, screws, combinations thereof or the like may be used.

The helicoidal end part 70 may have a continuous external surface 79, so as to facilitate the insertion of the geothermal pile 30 into the ground. The continuous external surface 79 is typically relatively smooth. Alternatively, the helicoidal end part 70 could have a discontinuous external surface, and/or a relatively non-smooth (i.e., uneven or rough) surface, according to the needs of one skilled in the art.

As it has been previously mentioned, the second end 36 may vary in shape and dimensions, and may be provided with additional elements, such as the helicoidal end part 70 or other mechanical equivalents, which could facilitate the insertions of the geothermal pile 30 into the ground (i.e., the underground area) to maximize or at least optimize the gradient of temperature between the first end 32 and the second end 36 (i.e., at a depth considered as appropriate by one skilled in the art).

Referring to FIGS. 1B and 2, the geothermal pile 30 includes an electrical output 44. The electrical output 44 is electrically coupled to the thermoelectric cell 38 (or the thermoelectric cell) and is configured for extracting the electricity from the thermoelectric cell 38. In one embodiment, the electrical output 44 is electrically connected to the thermoelectric cell 38. For example, the electrical output 44 may be embodied by a terminal. The expression "terminal" herein refers to a point to which external circuits or electrical load could be connected. The extracted electricity may then be used to charge a battery, a cell phone, a capacitor, or the like, and may even be used to power a light source. The electrical output 44 may be enclosed in an electrical box 45, such as the one illustrated in FIGS. 1B-C, 2 and 9.

Figure 9:
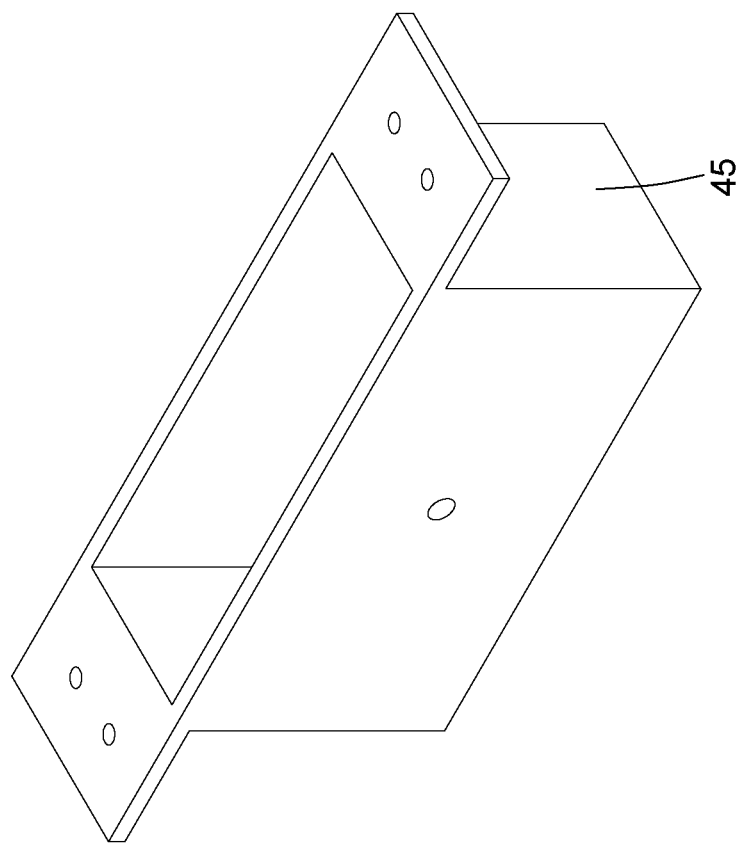
FIG. 9 shows an electrical box, in accordance with one embodiment.

One embodiment of the electrical box 45 is shown in FIG. 9. The electrical box 45 is made from a polymeric material and has a substantial parallelepipedal shape. In some embodiments, the polymeric material may be a thermoplastic polymer, such as acrylonitrile butadiene styrene (ABS, chemical formula $(C_8H_8 \cdot C_4H_6 \cdot C_3H_3N)_n$). Alternatively, the electrical box 45 material could be made from PVC. As it will be readily understood, the geometrical configuration, for example and without being limitative the size and shape, of the electrical box 45 may vary according to one's needs or the configuration of the electrical output 44.

Figure 18A:
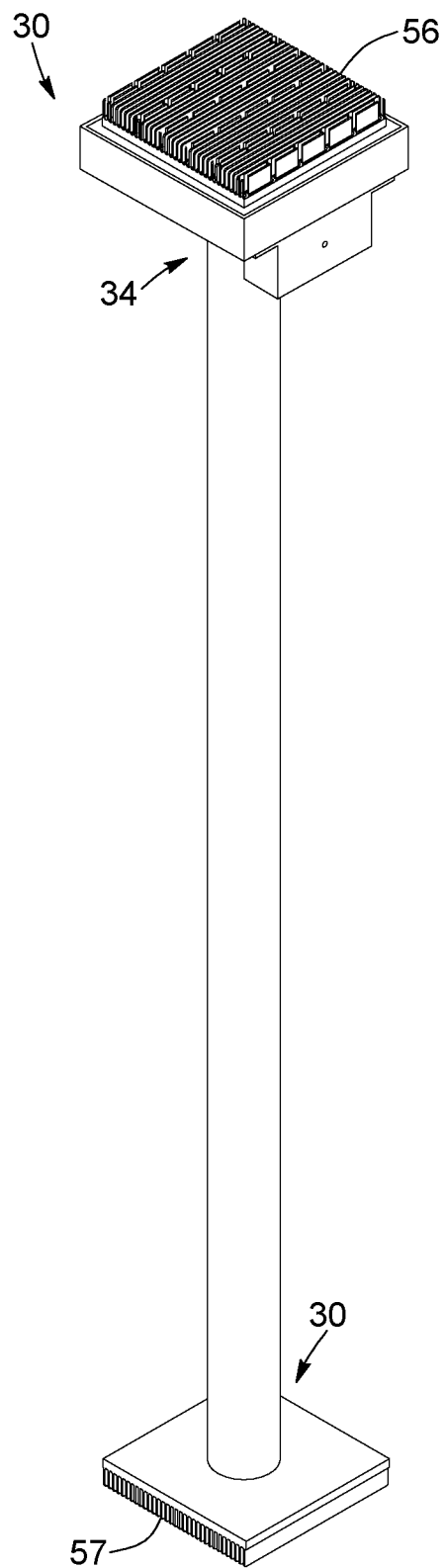
FIGS. 18A-B show a geothermal pile comprising an atmospheric heat sink and a submergible heat sink, in accordance with one embodiment.
Figure 18B:
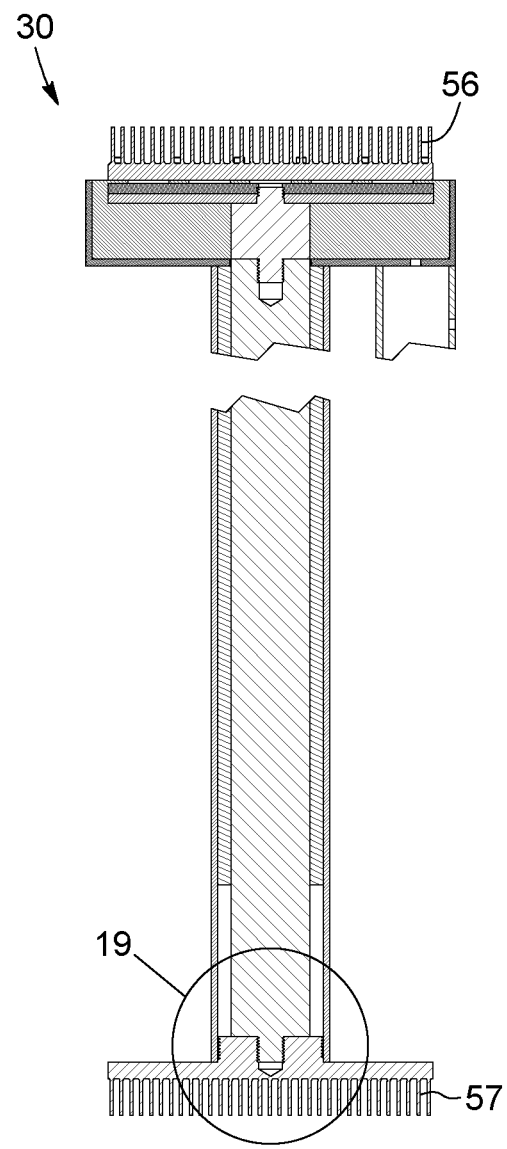
Figure 19:
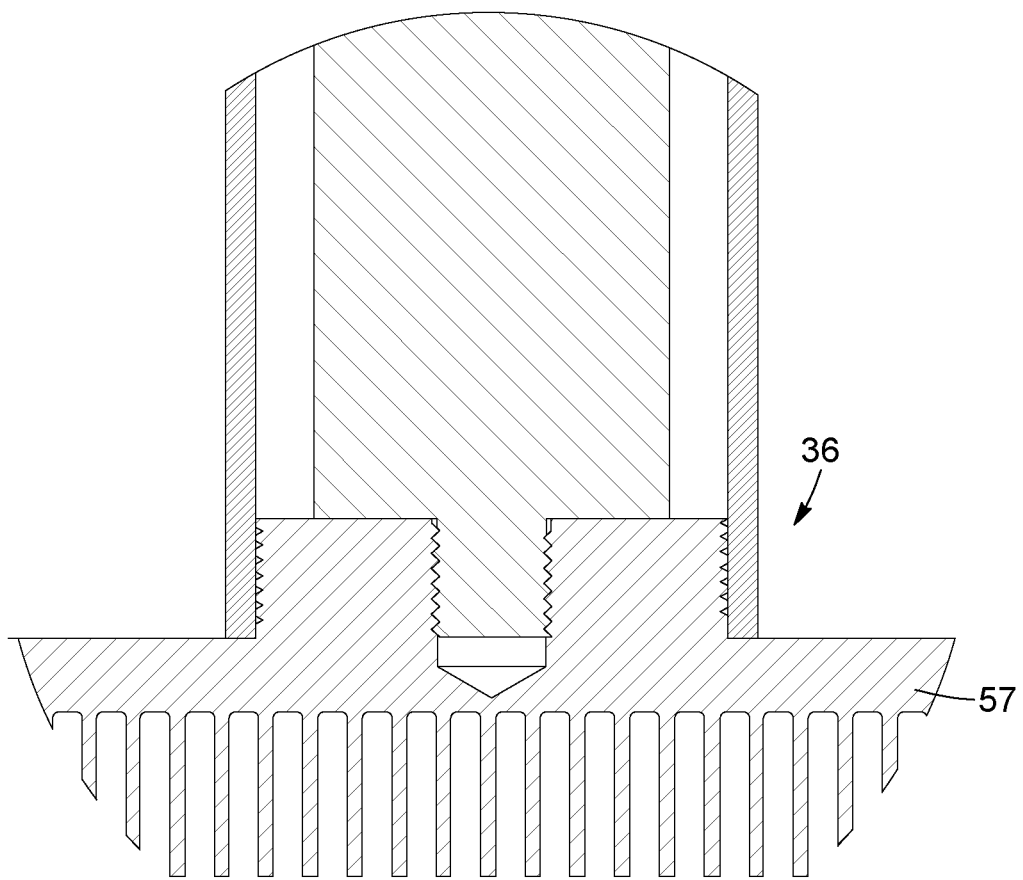
FIG. 19 shows a close-up view of the submergible heat sink shown in FIGS. 18A-B.

Referring to FIGS. 18A-B and 19, an embodiment of a geothermal pile 30 for harvesting electricity from a gradient of temperature between the ambient air and the underground area is shown. As will be understood from the description below, geothermal piles according to such embodiments may be particularly useful in contexts where heat exchange with water or another liquid medium is desired or required.

In the illustrated variant, the geothermal pile 30 is similar to the one which has been described so far, but further comprises a submergible heat exchanger 57 provided at the second end 36 of the elongated thermally-conductive body 32 and projects downwardly therefrom. The submergible heat exchanger sink 57 may be structurally similar to the atmospheric heat sink 56 which has been described with respect to FIGS. 2 and 3A-B, but is configured to be thermally coupled, in use, with a liquid medium (i.e., "submerged" in the liquid medium, instead of being exposed to the ambient air).

Figure 20B:
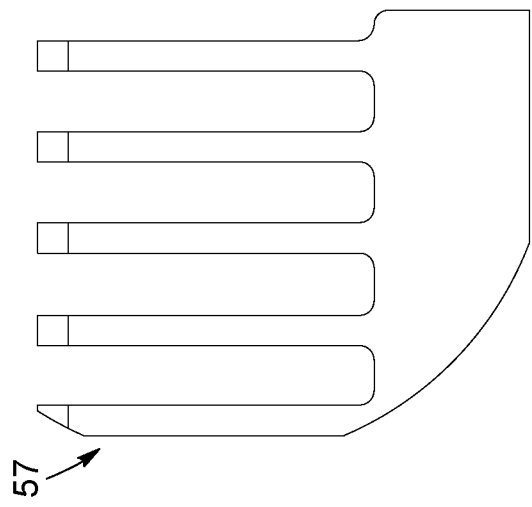
FIGS. 20A-B illustrate a close-up view of the submergible heat sink shown in FIGS. 18A-B.
Figure 20A:
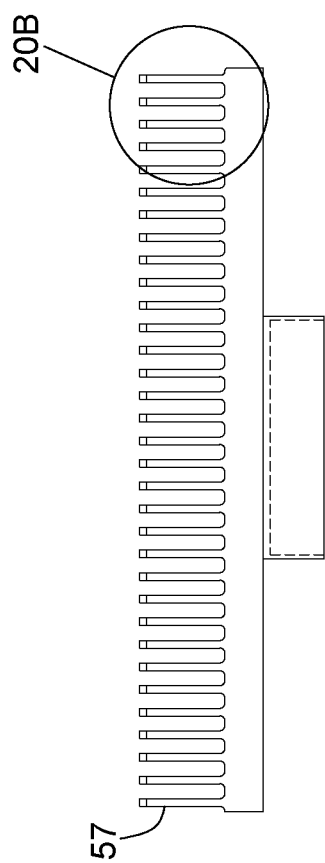

As better illustrated in FIGS. 20A-B, the submergible heat exchanger 57 comprises an array of vertically projecting fins, similar to the atmospheric heat sink 56. For example, the array of vertically projecting fins could comprise one or many rectangular fin(s). It will be readily understood that the submergible heat exchanger 57 has a surface area that is designed and configured to at least optimize or maximize the exposure or thermal contact between the submergible heat exchanger 57 and the liquid medium. That is, the material, the geometrical configuration and/or surface treatment of the surface area of the submergible heat exchanger 57 are selected according to the needs of one skilled in the art. For example, the submergible heat exchanger 57 could be made from aluminium, for example and without being limitative, 1060-H16.

Figure 21:
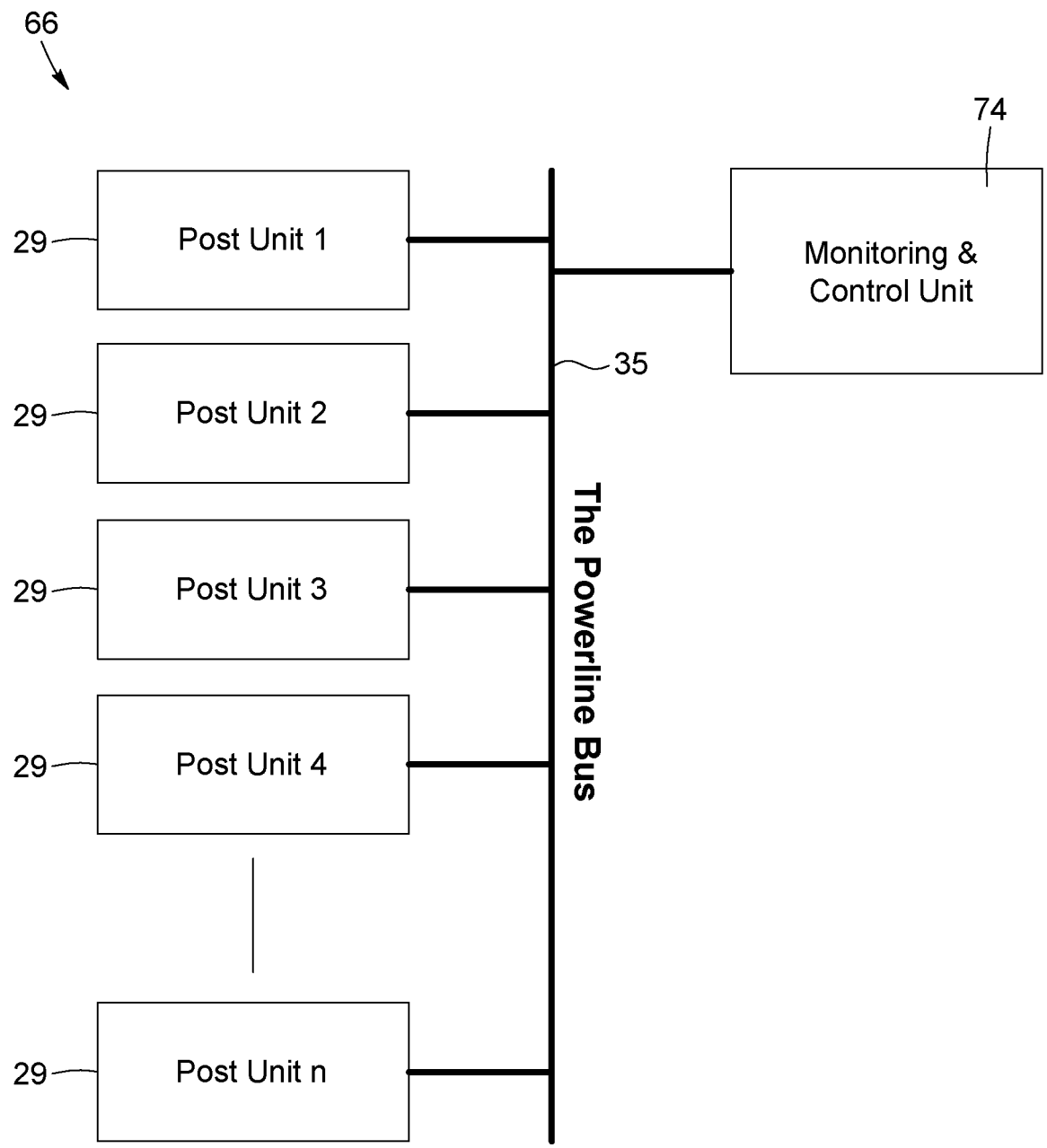
FIG. 21 illustrates a network of geothermal piles, in accordance with one embodiment.

With reference to FIG. 21, there is shown a network 66 according to one embodiment. The network 66 can comprise a plurality of post units 29. As illustrated, each geothermal pile 30 can be part of an individual post unit 29. Each geothermal pile 30 harvests electricity from the gradient of temperature between the ambient air and the underground area, according to what has been previously described.

The network 66 may comprise a combination of the geothermal piles 30 which have been described so far. It is understood that each geothermal pile could either be similar or different one from another. For example, and without being limitative, some of the geothermal pile(s) 30 of the network 66 may have one "tapered" second end 36 insertable into the underground, while some other(s) may be provided with the submergible heat sink 57, for instance in a scenario in which some geothermal pile are simultaneously on-shore and off-shore. Alternatively, the network 66 may comprise only one "type" or "configuration" of the geothermal piles 30 (e.g., the geothermal piles 30 having a tapered second end 36 or the geothermal piles 30 having the submergible heat sink). It will be readily understood that the configuration of the network 66, and more particularly the configuration of each individual post unit 29 (and associated geothermal pile(s) 30) may be adjusted to the needs of one skilled in the art, and that the provided examples should not be considered limitative.

Figure 22:
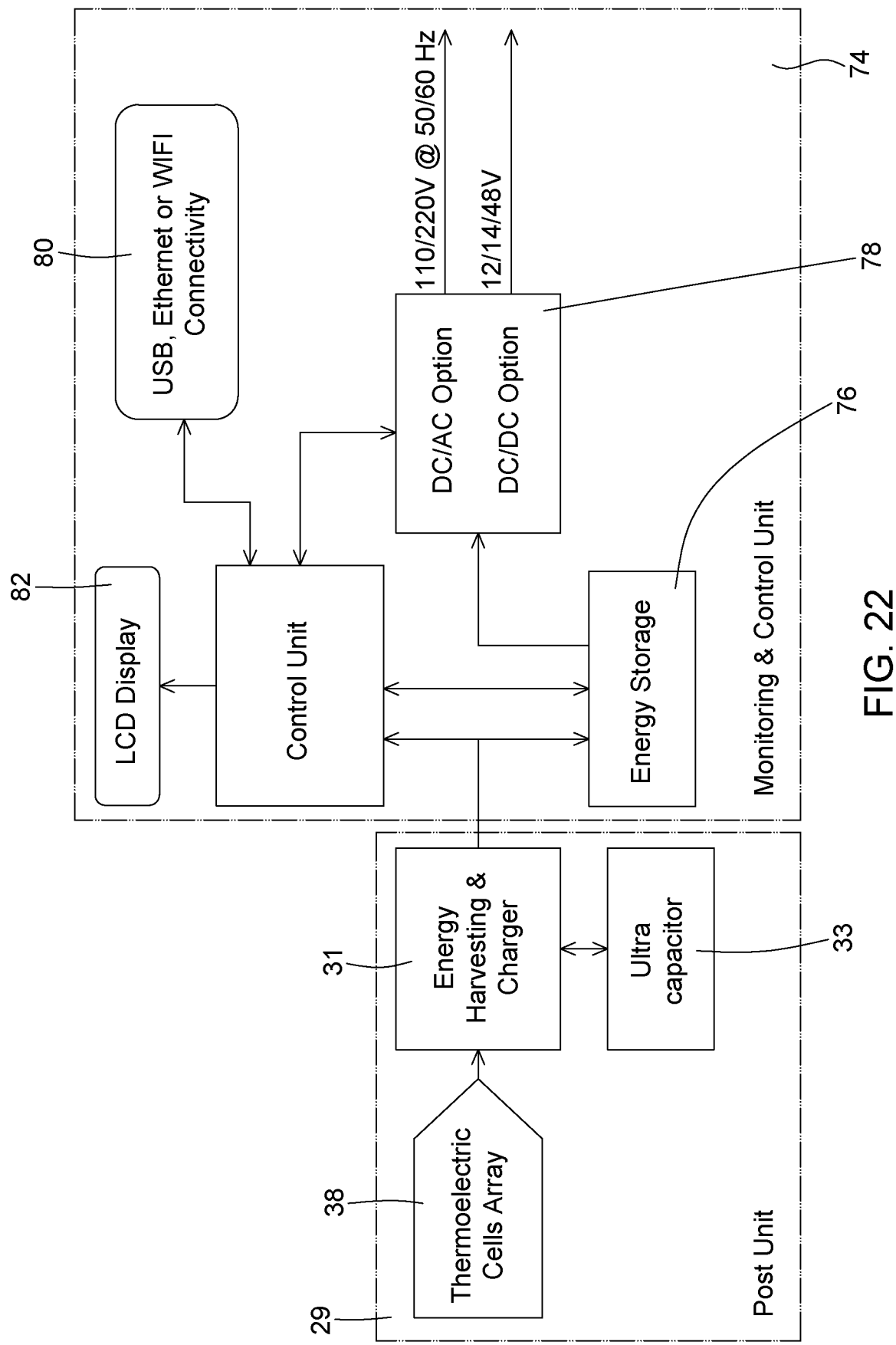
FIG. 22 illustrates a monitoring unit operatively connected to one of the post units illustrated in FIG. 21, in accordance with one embodiment.

Now referring to FIGS. 21 and 22, each illustrated post unit 29 further includes a charger 31 coupled with a capacitor 33. In the illustrated variant, the network 66 is coupled with a monitoring and control unit 74. In this variant, the post unit 29 transforms the energy harvested from the thermoelectric cell 38 of the geothermal pile 30 into usable energy, which is sent to the monitoring and control unit 74.

As its name entails, the monitoring and control unit 74 monitors and controls the whole network 66 and its energy feeding. In use, the monitoring and control unit 74 may provide a real-time estimate of the accumulated energy, and can store data on the network 66, as well as on each individual post unit 29. The monitoring and control unit 74 may also provide an estimation of the autonomy of the network 66, based on calculations performed by the monitoring and control unit 74 and the accumulated data. The calculations are typically based on the gradient of temperature built in each of the thermoelectric generators 38, the accumulated energy, and the user consumption. Of course, each post unit 29 may comprise one or more thermoelectric cells 38 (i.e., one or more thermoelectric generators).

The post unit 29 is connected to the monitoring and control unit 74 through a powerline bus 35. The powerline bus 35 may be used for the communication between each post unit 29 and/or between each post unit 29 and the monitoring and control unit 74, as well as for the power feeding of each post unit 29. Of course, the monitoring and control unit 74 may be connected with one or many post unit(s) 29.

The monitoring and control unit 74 may comprise an energy storage device 76 for storing the energy (i.e., the electricity) generated by the post unit(s) 29 forming the network 66. In one embodiment, the energy storage device 76 comprises one or more supercapacitors. Alternatively, the energy storage device 76 could comprise any type of capacitor, for example and without being limitative, electrolytic capacitors, electrostatic double-layer capacitors, electrochemical capacitors or hybrid capacitors) or batteries. In some implementations, such capacitors and batteries may be able to handle substantially rapid charging and discharging cycles.

The monitoring and control unit 74 may also comprise a power outlet 78. The power outlet 78 is electrically coupled to post unit(s) 29 through the monitoring and control unit 74 and is configured for extracting the electricity from the post unit(s) 29. The user may then, for example, plug an external device to be charged or powered to the power outlet 78. The power outlet 78 may provide with DC/AC option, for example and without being limitative, 110/220 V @ 50/60 Hz, or DC/DC option, for example and without being limitative, 12/24/48 V. In some implementations, the power outlet 78 may be embodied by a terminal, for example and without being limitative, a point at which is provided a point of connection to external circuits or electrical load.

The monitoring and control unit 74 may also comprise a supplementary module 80. The supplementary module 80 could comprise, for example, connectors and/or interface allowing for USB, Ethernet or Wi-Fi connectivity to the monitoring and control unit 74. Such a supplementary module 80 can provide the post unit 29 and/or the network 66 with improved functionalities.

The monitoring and control unit 74 may also comprise a display 82. The display 82 could be, for example, an LCD display for displaying the results of the calculations which have been previously mentioned or the estimations of the accumulated energy or the power consumption.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. A geothermal pile, comprising:
    an elongated thermally-conductive body having a first end and a second end opposite said first end, said second end being configured to be introduced, in use, into an underground area;
    a thermoelectric cell provided at said first end so as to be exposed to ambient air when said second end is introduced into the underground area, said thermoelectric cell being in thermal contact with said second end of said elongated thermally-conductive body, said thermoelectric cell being configured to generate electricity from a gradient of temperature between a first temperature of said ambient air and a second temperature of said underground area;
    an atmospheric heat sink provided at said first end, said atmospheric heat sink being thermally coupled with said ambient air and with said thermoelectric cell;
    a housing provided at said first end, the housing being thermally separated from said atmospheric heat sink; and
    an electrical output electrically connected to said thermoelectric cell.

2. The geothermal pile of claim 1, wherein said thermoelectric cell includes one or more thermoelectric generators, each thermoelectric generator comprising a thermoelectric junction.

3. The geothermal pile of claim 2, wherein said thermoelectric junction comprises two plates and a thermoelectric material in contact with and sandwiched between said two plates.

4. The geothermal pile of claim 3, wherein a first one of said two plates has a first outer surface and a second one of said two plates has a second outer surface opposite said first outer surface, said first outer surface and said second outer surface being respectively exposed to said first temperature and said second temperature when said second end is introduced into said underground area.

5. The geothermal pile of claim 1, wherein said elongated thermally-conductive body is made from copper.

6. The geothermal pile of claim 1, wherein said elongated thermally-conductive body is a rod having a substantially circular cross-section.

7. The geothermal pile of claim 1, further comprising a metal tube, wherein said elongated thermally-conductive body is concentrically disposed within said metal tube.

8. The geothermal pile of claim 7, further comprising an insulating tube, wherein said metal tube is concentrically disposed within said insulating tube.

9. The geothermal pile of claim 8, further comprising a plastic tube, wherein said insulating tube is concentrically disposed within said plastic tube.

10. The geothermal pile of claim 1, wherein said second end is tapered.

11. The geothermal pile of claim 1, further comprising a helicoidal end part affixed to the second end of the elongated thermally-conductive body, the helicoidal end part having a rotation axis aligned with a longitudinal axis of said elongated thermally-conductive body, said helicoidal end part being configured to enter the ground when pushed towards the ground and rotated about said rotation axis, thereby inserting said second end into said underground area.

12. The geothermal pile of claim 11, wherein said helicoidal end part is made from carbon steel.

13. The geothermal pile of claim 1, wherein said thermoelectric cell converts said gradient of temperature into electricity through the Seebeck effect.

14. The geothermal pile of claim 1, wherein said atmospheric heat sink extends over said thermoelectric cell.

15. The geothermal pile of claim 1, wherein said atmospheric heat sink is made from aluminum.

16. The geothermal pile of claim 1, further comprising a housing for receiving said thermoelectric cell, said atmospheric sink and said temperature sensor.

17. The geothermal pile of claim 1, further comprising a submergible heat exchanger provided at said second end.

18. The geothermal pile of claim 17, wherein said submergible heat exchanger is made from aluminum.

19. The geothermal pile of claim 1, further comprising a temperature sensor mounted at said first end, said temperature sensor being thermally coupled with said thermoelectric cell.

20. A geothermal pile, comprising:
an elongated thermally-conductive body having a first end and a second end opposite said first end, said second end being configured to be introduced, in use, into an underground area;
a thermoelectric cell provided at said first end so as to be exposed to ambient air when said second end is introduced into the underground area, said thermoelectric cell being in thermal contact with said second end of said elongated thermally-conductive body, said thermoelectric cell being configured to generate electricity from a gradient of temperature between a first temperature of said ambient air and a second temperature of said underground area;
an electrical output electrically connected to said thermoelectric cell;
a metal tube, wherein said elongated thermally-conductive body is concentrically disposed within said metal tube;
an insulating tube, wherein said metal tube is concentrically disposed within said insulating tube; and
a plastic tube, wherein said insulating tube is concentrically disposed within said plastic tube.

21. The geothermal pile of claim 20, further comprising an atmospheric heat sink provided at said first end, said atmospheric heat sink being thermally coupled with said ambient air and with said thermoelectric cell.

22. The geothermal pile of claim 21, further comprising a temperature sensor mounted at said first end, said temperature sensor being thermally coupled with said thermoelectric cell.

23. A geothermal pile, comprising:
an elongated thermally-conductive body having a first end and a second end opposite said first end, said second end being configured to be introduced, in use, into an underground area;
a thermoelectric cell provided at said first end so as to be exposed to ambient air when said second end is introduced into the underground area, said thermoelectric cell being in thermal contact with said second end of said elongated thermally-conductive body, said thermoelectric cell being configured to generate electricity from a gradient of temperature between a first temperature of said ambient air and a second temperature of said underground area;
an electrical output electrically connected to said thermoelectric cell; and
a helicoidal end part affixed to the second end of the elongated thermally-conductive body, the helicoidal end part having a rotation axis aligned with a longitudinal axis of said elongated thermally-conductive body, said helicoidal end part being configured to enter the ground when pushed towards the ground and rotated about said rotation axis, thereby inserting said second end into said underground area.

24. The geothermal pile of claim 23, further comprising a temperature sensor mounted at said first end, said temperature sensor being thermally coupled with said thermoelectric cell.

* * * * *